(12) United States Patent
Kratzsch (10) Patent No.: US 11,008,982 B2
(45) Date of Patent: May 18, 2021

(54) EXHAUST-GAS TURBOCHARGER

(71) Applicant: IAV GmbH Ingenieurgesellschaft Auto und Verkehr, Berlin (DE)

(72) Inventor: Matthias Kratzsch, Kleinmachnow (DE)

(73) Assignee: IAV GMBH INGENIEURGESELLSCHAFT AUTO UND VERKEHR, Berlin (DE)

( * ) Notice: Subject to any disclaimer, the term of this patent is extended or adjusted under 35 U.S.C. 154(b) by 0 days.

(21) Appl. No.: 16/490,569

(22) PCT Filed: Mar. 12, 2018

(86) PCT No.: PCT/DE2018/100220
§ 371 (c)(1),
(2) Date: Sep. 2, 2019

(87) PCT Pub. No.: WO2018/171833
PCT Pub. Date: Sep. 27, 2018

(65) Prior Publication Data
US 2020/0072168 A1 Mar. 5, 2020

(30) Foreign Application Priority Data
Mar. 22, 2017 (DE) ...................... 10 2017 106 164.9

(51) Int. Cl.
*F02M 26/13* (2016.01)
*F02M 26/04* (2016.01)
(Continued)

(52) U.S. Cl.
CPC ............. *F02M 26/13* (2016.02); *F02B 37/00* (2013.01); *F02M 26/04* (2016.02); *F04D 17/08* (2013.01);
(Continued)

(58) Field of Classification Search
CPC ............ F05D 2220/40; F05D 2240/60; F05D 2240/61; F02B 37/00–24; F02C 6/12;
(Continued)

(56) References Cited

U.S. PATENT DOCUMENTS

| 2,165,448 A | 7/1939 | Browne |
| 2,397,941 A | 4/1946 | Birkigt |

(Continued)

FOREIGN PATENT DOCUMENTS

| DE | 809690 C | 8/1951 |
| DE | 2855687 A1 | 6/1979 |

(Continued)

*Primary Examiner* — Mark A Laurenzi
*Assistant Examiner* — Xiaoting Hu
(74) *Attorney, Agent, or Firm* — Leydig, Voit & Mayer, Ltd.

(57) ABSTRACT

An exhaust-gas turbocharger includes: an exhaust-gas turbocharger housing having a turbine housing, a compressor housing, and a bearing housing; a turbine in the turbine housing; a compressor in the compressor housing; and a shaft rotatably mounted in the bearing housing by which the turbine and the compressor are rigidly connected, at least one channel having an inlet opening and an outlet opening being formed inside the shaft, the inlet opening and/or the outlet opening being arranged in a radial direction on a circumference of the shaft between the turbine and the compressor. The at least one channel is part of a channel system of an exhaust-gas recirculation system, a reducing agent infeed, or a secondary air infeed. For the secondary air infeed, an interior space of the compressor housing is in fluidic connection with an interior space of the turbine housing.

3 Claims, 5 Drawing Sheets

(51) Int. Cl.
*F02B 37/00* (2006.01)
*F04D 17/08* (2006.01)
*F04D 29/42* (2006.01)

(52) U.S. Cl.
CPC ...... *F04D 29/4206* (2013.01); *F05D 2220/40* (2013.01); *F05D 2240/61* (2013.01)

(58) Field of Classification Search
CPC ..... Y02T 10/12; F04D 13/043; F04D 29/043; F04D 29/053; F04D 29/4206; F04D 25/045; F04D 17/08; F02M 26/04; F02M 26/05; F02M 26/06; F02M 26/07; F02M 26/08; F02M 26/09; F02M 26/10; F02M 26/13; F02M 26/14; F02M 26/15; F02M 26/17; F02M 26/19; F02M 26/20; F02M 25/00; F02M 23/00–14
See application file for complete search history.

(56) References Cited

U.S. PATENT DOCUMENTS

| | | |
|---|---|---|
| 4,179,892 A | 12/1979 | Heydrich |
| 6,050,095 A | 4/2000 | Blake |
| 2012/0159950 A1 | 6/2012 | Wu |
| 2013/0000300 A1 | 1/2013 | O'Hara |

FOREIGN PATENT DOCUMENTS

| | | | |
|---|---|---|---|
| DE | 4312077 C1 | 1/1994 | |
| DE | 19948220 A1 | 1/2001 | |
| DE | 10104073 A1 | 8/2002 | |
| DE | 10204073 A1 | 8/2003 | |
| DE | 4338696 B4 | 2/2006 | |
| DE | 102009020646 A1 | 11/2010 | |
| DE | 102009020646 A1 * | 11/2010 | ............ F04D 25/06 |
| DE | 102015200053 A1 | 7/2015 | |
| EP | 1295016 B1 | 3/2003 | |
| EP | 1467062 A2 | 10/2004 | |
| EP | 1992798 A1 | 11/2008 | |
| EP | 1767755 B1 | 1/2011 | |
| EP | 1191216 B1 | 2/2013 | |
| EP | 2818640 A2 | 12/2014 | |
| GB | 2500192 A | 9/2013 | |
| JP | S5557622 A | 4/1980 | |
| JP | 2008215097 A | 9/2008 | |
| JP | 2015113711 A | 6/2015 | |
| KR | 20170009130 A | 1/2017 | |
| WO | WO 9711263 A1 | 3/1997 | |
| WO | WO 2008003651 A1 | 1/2008 | |
| WO | WO 2015098391 A1 | 7/2015 | |
| WO | WO 2015167844 A1 | 11/2015 | |

* cited by examiner

EXHAUST-GAS TURBOCHARGER

CROSS-REFERENCE TO PRIOR APPLICATIONS

This application is a U.S. National Phase application under 35 U.S.C. § 371 of International Application No. PCT/DE2018/100220, filed on Mar. 12, 2018, and claims benefit to German Patent Application No. DE 10 2017 106 164.9, filed on Mar. 22, 2017. The International Application was published in German on Sep. 27, 2018 as WO 2018/171833 under PCT Article 21(2).

FIELD

The invention relates to an exhaust-gas turbocharger.

BACKGROUND

Exhaust-gas turbochargers are known for increasing the efficiency and increasing the power of internal combustion engines, and serve to turbocharge the internal combustion engine by using the exhaust-gas energy. For this purpose, the exhaust-gas turbocharger comprises a turbine arranged in a turbine housing in the exhaust-gas line and a compressor arranged in a compressor housing in the combustion-air line, wherein the turbine and the compressor are mounted on a common shaft for power transmission and form the rotor of the exhaust-gas turbocharger. During operation of the internal combustion engine, the turbine converts the exhaust-gas energy available in the exhaust-gas line into mechanical energy and uses this to compress the intake air in the combustion-air line by means of the compressor. The charge level and, accordingly, the efficiency and power are increased by the compression of the intake air.

Exhaust-gas recirculation systems are known which reduce nitrogen emissions or reduce charge-cycle losses in internal combustion engines, partially replacing the oxygen taking part in the combustion in the cylinder of the internal combustion engine by recirculated exhaust gas as inert gas. Particularly in the case of gasoline internal combustion engines, exhaust-gas recirculation reduces the charge-cycle losses due to a possible dethrottling, whereby efficiency is increased in the part-load range. Particularly in the case of diesel internal combustion engines, exhaust-gas recirculation reduces nitrogen oxide emissions due to the reduced combustion temperature resulting from the lower oxygen concentration. The exhaust-gas recirculation systems can take the form of internal exhaust-gas recirculation systems controlled by gas exchange valves or external, line-bound, exhaust-gas recirculation systems, wherein, in the case of an external exhaust-gas recirculation system, a distinction can be drawn between high-pressure exhaust-gas recirculation, low-pressure exhaust-gas recirculation, or multiple-path exhaust-gas recirculation. Accordingly, separate line systems and valve systems are necessary for an external exhaust-gas recirculation system.

A turbocharged internal combustion engine with an exhaust-gas turbocharger and exhaust-gas recirculation is known from patent specification DE 28 55 687 C2. The exhaust-gas recirculation system is embodied as a high-pressure exhaust-gas recirculation system with a connecting line between the high-pressure side of the turbine and the high-pressure side of the compressor. A valve is provided in the exhaust-gas recirculation line, by means of which the exhaust-gas recirculation line can be opened or closed as required.

European patent specification EP 1 191 216 B1 discloses an exhaust-gas turbocharger with exhaust-gas recirculation. The exhaust-gas recirculation system is embodied as a high-pressure exhaust-gas recirculation system with a connecting line between the high-pressure side of the turbine and the high-pressure side of the compressor, wherein the exhaust-gas recirculation line is connected directly to the turbine housing and to the compressor housing. A valve is provided in the exhaust-gas recirculation line, by means of which the exhaust-gas recirculation line can be opened or closed as required.

Patent specification DE 43 12 077 C1 discloses an exhaust-gas turbocharger for a turbocharged internal combustion engine, wherein the exhaust-gas turbocharger has a turbine and a compressor. For the purpose of recirculating exhaust gas or cooling the turbine components by means of charge air, a line is provided as a flow connection between the pressure side of the compressor and inflow side of the turbine. The flow connection is controlled by means of a variable guide-vane ring in the turbine housing. The charge air infeed from the pressure side to the inflow side or the exhaust-gas recirculation from the inflow side to the pressure side takes place as a function of the pressure gradient between the pressure side and inflow side, in which the guide-vane ring is actuated by an engine-map-controlled regulator.

Catalysts which operate according to the principle of selective catalytic reduction are known which further reduce nitrogen emissions in internal combustion engines. For the reduction of nitrogen oxides, such SCR catalysts require a reducing agent—in particular, ammonia—which, in the form of an aqueous urea solution, is added to the exhaust gas by means of a metering system. An optimal atomization and evaporation of the aqueous urea solution is of importance for the effectiveness of nitrogen oxide reduction. The aqueous urea solution is therefore injected into the exhaust-gas line by means of an injector upstream of the SCR catalytic converter, and optionally evaporated by means of additional heaters. Such SCR exhaust-gas aftertreatment systems are used primarily in diesel internal combustion engines.

European patent specification EP 1 295 016 B1 discloses an internal combustion engine which has a turbine in a turbine housing in the exhaust-gas line. For reducing the nitrogen emissions arising during operation of the internal combustion engine, an injection of aqueous urea solution into the exhaust gas is provided, wherein the injection nozzle is positioned in the turbine housing, and the aqueous urea solution is injected into the turbine chamber.

European patent specification EP 1 767 755 B1 discloses an internal combustion engine with an exhaust-gas turbocharger which has an ammonia reactor for reducing the nitrogen oxide emissions. The ammonia reactor has an evaporation/hydrolysis chamber which is positioned in the turbine housing of the exhaust-gas turbocharger such that the exhaust-gas waste heat is used for ammonia generation. The evaporation/hydrolysis chamber is, further, fluidically connected to the exhaust-gas line upstream and downstream of the turbine so that an exhaust-gas substream can be routed through the evaporation/hydrolysis chamber. Aqueous urea solution is fed into the evaporation/hydrolysis chamber by means of a metering device, wherein ammonia is formed by thermolysis and hydrolysis by using the exhaust-gas heat and steam from the exhaust-gas substream. Downstream of the turbine, the exhaust-gas substream with ammonia is then fed into the exhaust-gas line in order to reduce nitrogen oxide emissions.

For reducing hydrocarbon emissions and carbon monoxide emissions in gasoline internal combustion engines during the cold-start and warm-up phases or during regeneration of a particulate filter in the case of diesel engines, secondary air systems are known which cause afterburning of unburned components in the exhaust gas. For this purpose, by means of the secondary air system, air is supplied to the exhaust gas in the exhaust-gas line, bypassing the internal combustion engine. Afterburning reduces the hydrocarbon emissions and carbon monoxide emissions, and at the same time increases the exhaust-gas temperature to enable a faster activation of exhaust-gas aftertreatment devices. Secondary air systems are also known which conduct charge air into the exhaust-gas line to cool components in the exhaust-gas line while bypassing the internal combustion engine. Furthermore, solutions are known by means of which the exhaust gas can be enriched with fuel.

Patent specification DE 43 38 696 B4 discloses a device for exhaust-gas detoxification for internal combustion engines with an exhaust-gas turbocharger. This device comprises a secondary air system by means of which secondary air is blown into the exhaust-gas line downstream of the turbine.

Published patent application DE 102 04 073 A1 discloses a diesel internal combustion engine with an exhaust-gas turbocharger and secondary air system. For a regeneration of a particulate filter of the diesel internal combustion engine, compressed charge air is extracted upstream of the compressor of the exhaust-gas turbocharger and added to the exhaust gas downstream of the turbine and upstream of the particulate filter. In conjunction with an increase in unburnt exhaust-gas constituents, the particulate filter is regenerated using the secondary air system.

From the publication of international patent application WO 2008/00365 A1, a secondary air system for a turbine of an exhaust-gas turbocharger is known, by means of which a cooling of turbine components is to be achieved. The cooling air used for this purpose is removed at the outlet of the compressor.

In the known systems, an inadequate mixing, and thus a stratification of the recirculated exhaust gas, can, as a function of the pressure conditions and flow conditions, occur in the charge air, in the supplied secondary air, or in the supplied reducing agent in the exhaust gas. This inadequate mixing has an influence—in particular, during exhaust-gas recirculation—on the uniform distribution of the recirculated exhaust gas to the individual cylinders of a multi-cylinder internal combustion engine, on the reduction performance of the SCR catalytic converter during the infeeding of reducing agent, and, during the infeeding of secondary air, on afterburning or on component cooling.

From the Japanese published patent application JP 2008-215097 A, an exhaust-gas turbocharger is known which has a device for supplying fuel to the exhaust gas. For this purpose, the shaft of the exhaust-gas turbocharger is provided with a fuel channel. The fuel channel is provided with an inlet on the compressor side which is connected to an infeed. The infeed here extends partially over the inflow region of the compressor. The fuel channel is further provided with several outlets which are arranged in the region of the turbine blades. This is intended to effect a uniform distribution of the fuel in the exhaust gas.

It is disadvantageous that the infeed extends beyond the region of inflow to the compressor and thus influences the inflow. Furthermore, when designing the connection between the infeed and the shaft, a compromise must be made between tightness and friction.

The published patent application KR 1020170009130 A discloses an exhaust-gas turbocharger with an at least partially hollow shaft, wherein the channel in the shaft is part of a lubrication system of the exhaust-gas turbocharger.

Patent specification DE 809 690 B discloses an impeller for radial blowers and radial turbines, wherein a channel of an impeller cooling device is provided within a partially hollow impeller shaft. This impeller with cooling, which is illustrated as a sheet metal construction, is also intended to be used for exhaust-gas turbines.

Published patent application WO 97/11263 A1 discloses an exhaust-gas turbocharger having a hollow shaft as turbocharger shaft, wherein the channel formed thereby is used as a cooling channel. The coolant infeed is here effected via a nozzle fixed on the housing on the end face of the hollow shaft.

Published patent application JP 2015-113711 A discloses an exhaust-gas turbocharger having a hollow turbine with a turbine shaft, wherein a catalytically-active layer is arranged within the cavity in the turbine. In the exhaust-gas system, exhaust gas is recirculated downstream of the turbine via an exhaust-gas channel in the turbine shaft and the hollow turbine.

Published patent application DE 10 2009 020 646 A1 discloses an electrically-driven turbocharger having a shaft, wherein the shaft, at least in longitudinal sections, has a hollow channel for cooling the rotor. Furthermore, in the shaft, a connecting channel is provided between the hollow channel and the impeller.

Published patent application WO 2015/167844 A1 discloses a lubricant infeed of an impeller shaft of an exhaust-gas turbocharger, wherein, at the housing end, an annular channel running over the circumference of the shaft is provided for an oil infeed into an oil channel in the impeller shaft.

Published patent application JPS 55-57622 A discloses an exhaust-gas recirculation system, wherein the shaft of an exhaust-gas turbocharger is designed as a hollow shaft and connects the inlet channel and the outlet channel to one another. The introduction of the exhaust gas into the intake channel takes place by means of several radially-aligned openings.

Published patent application WO 2015/098391 A1 describes an exhaust-gas recirculation system for a supercharged internal combustion engine in which the recirculated exhaust gas is introduced upstream of the compressor impeller via an inlet cone in the compressor inlet.

SUMMARY

In an embodiment, the present invention provides an exhaust-gas turbocharger, comprising: an exhaust-gas turbocharger housing having a turbine housing, a compressor housing, and a bearing housing; a turbine in the turbine housing; a compressor in the compressor housing; and a shaft rotatably mounted in the bearing housing by which the turbine and the compressor are rigidly connected, at least one channel having an inlet opening and an outlet opening being formed inside the shaft, the inlet opening and/or the outlet opening being arranged in a radial direction on a circumference of the shaft between the turbine and the compressor, wherein the at least one channel is part of a channel system of an exhaust-gas recirculation system, a reducing agent infeed, or a secondary air infeed, wherein, for the secondary air infeed, an interior space of the compressor housing is in fluidic connection with an interior space of the turbine housing.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an improved exhaust-gas turbocharger.

The invention provides an exhaust-gas turbocharger that is advantageous according to the invention, having exhaust-gas recirculation, a reducing agent infeed, and/or a secondary air infeed. The exhaust-gas turbocharger comprises a turbine in a turbine housing, a compressor in a compressor housing, and a shaft, rotatably mounted in a bearing housing, by means of which the turbine and the compressor are rigidly connected. The turbine, the compressor, and the shaft here form the rotor of the exhaust-gas turbocharger, wherein the shaft is mounted in the bearing housing by means of shaft bearings. The compressor housing, the turbine housing, and the bearing housing form the exhaust-gas turbocharger housing. The compressor housing with the compressor is designed for an arrangement in a combustion air line of an internal combustion engine for compressing intake combustion air, and the turbine housing with the turbine for an arrangement in an exhaust-gas line of the internal combustion engine for expanding exhaust gas, wherein the mechanical energy provided by the expansion of the exhaust gas serves to compress the combustion air.

The shaft is at least partially designed as a hollow shaft and is accordingly characterized in that at least one channel is formed coaxially inside the shaft and extends at least partially along the shaft. The channel is part of a channel system of an exhaust-gas recirculation system, a reducing agent infeed, or a secondary air infeed. The channel has at least one inlet opening and at least one outlet opening, via which exhaust gas, reducing agent, or secondary air is introduced into the channel and is discharged from the channel.

In an advantageous manner according to the invention, the at least one inlet opening and/or the at least one outlet opening are arranged on the circumference of the shaft, wherein the inlet opening is arranged in the radial direction on the circumference of the shaft, i.e., on the lateral surface of the shaft or on a first end face of the shaft, and the outlet opening is arranged in the radial direction on the circumference of the shaft, i.e., on the lateral surface of the shaft or on a second end face of the shaft.

In an advantageous manner according to the invention, the inlet opening and/or the outlet opening are arranged in the radial direction on the circumference of the shaft between turbine and compressor. In a particularly advantageous manner according to the invention, the inlet opening and/or outlet opening are in fluidic connection with at least one infeed in the exhaust-gas turbocharger housing—in particular, in the bearing housing. Accordingly, the connection of the infeed and inlet opening or of the infeed and outlet opening is arranged in the region between the compressor and the turbine. Accordingly, the infeed can be sealed in a simple manner by radial seals between shaft and exhaust-gas turbocharger housing, resulting in only a slight influence of friction. The infeed is part of the channel system of the exhaust-gas recirculation system, the reducing agent infeed, or the secondary air infeed. The channel system accordingly extends over the shaft and the exhaust-gas turbocharger housing and comprises the at least one channel in the shaft and the at least one infeed in the exhaust-gas turbocharger housing. By arranging the infeed in the exhaust-gas turbocharger housing—in particular, in the bearing housing—the influence, known from the prior art, of the infeed on the inflow to the compressor is eliminated.

In an advantageous manner according to the invention, flow guidance elements can be provided in the region of the end face in order to support an optimal inflow via the inlet opening into the channel or an optimal outflow via the outlet opening out of the channel. The flow guidance elements can here be connected to the compressor housing or to the turbine housing, or to the shaft.

In an advantageous manner according to the invention, the infeed comprises an annular channel around the shaft in the region of the inlet opening or outlet opening in the exhaust-gas turbocharger housing, so that the entry of exhaust gas, reducing agent, or secondary air into the channel, or the outlet of exhaust gas, reducing agent, or secondary air from the channel via the annular channel can take place independently of the rotational position of the shaft. In an advantageous manner according to the invention, several infeeds are also arranged distributed over the circumference and connected to the annular channel.

If the inlet opening is arranged in the radial direction on the circumference of the shaft, the inlet opening is thus arranged in the region between the compressor and the turbine, and is in fluidic connection with the at least one infeed in the exhaust-gas turbocharger housing—in particular, in the bearing housing.

Advantageously, the outlet opening is in fluidic connection with a centrifugal channel which is arranged in the compressor or in the turbine. The centrifugal channel extends mainly in the radial direction of the compressor or of the turbine. Alternatively, the outlet opening is arranged in the radial direction on the circumference of the shaft in the region of the inflow of the combustion air onto the compressor or in the region of the outflow of the exhaust-gas from the turbine. These arrangements improve the mixing of recirculated exhaust gas with charge air and/or of supplied reducing agent with exhaust gas and/or of supplied secondary air with exhaust gas.

For exhaust-gas recirculation, an interior space of the turbine housing is in fluidic connection with an interior space of the compressor housing by means of an exhaust-gas channel system, wherein the exhaust-gas channel system includes at least the channel as an exhaust-gas channel in the interior of the shaft, an exhaust-gas inlet opening, and an exhaust-gas outlet opening in the shaft. In the exhaust-gas channel system, an exhaust-gas valve unit is also provided, by means of which the fluidic connection via the exhaust-gas channel system can be opened for exhaust-gas recirculation and can be closed to stop exhaust-gas recirculation. The exhaust-gas valve unit is preferably accommodated in the exhaust-gas turbocharger housing. In an advantageous manner according to the invention, the exhaust-gas passage is fluidically connected to the interior space of the turbine housing in the direction of flow of the exhaust gas before the turbine, i.e., upstream of the turbine, and to the interior space of the compressor housing before the compressor, i.e., upstream of the compressor, or to a compressor centrifugal channel. The exhaust-gas channel system here comprises an exhaust-gas infeed, fluidly connected upstream of the turbine to the interior of the turbine housing, with the exhaust-gas valve unit and with an exhaust-gas annular channel; the exhaust-gas inlet opening fluidically connected to the exhaust-gas annular channel in the radial direction on the circumference of the shaft between the compressor and the turbine; the exhaust-gas channel inside the shaft fluidically connected to the exhaust-gas inlet opening; and the exhaust-gas outlet opening fluidically connected to the exhaust-gas channel. In a further development, the exhaust-gas outlet opening is arranged in the radial direction on the circumference of the shaft in the inflow region of the compressor. In an alternative development, the exhaust-gas channel system comprises the compressor centrifugal channel fluidically connected to the exhaust-gas outlet opening, wherein the exhaust-gas outlet opening is arranged in the radial direction on the circumference of the shaft in the region of the compressor.

For a reducing agent infeed, a reducing agent infeed is fluidically connected to the interior of the turbine housing by means of a reducing agent channel system, wherein the reducing agent channel system comprises at least the channel as reducing agent channel in the interior of the shaft, a reducing agent inlet opening, and a reducing agent outlet opening in the shaft. The reducing agent channel system is fluidically connected to a reducing agent metering device. In an advantageous manner according to the invention, the reducing agent channel system is fluidically connected to the interior of the turbine housing in the flow direction of the exhaust gas after the turbine, i.e., downstream of the turbine, or fluidically connected to a turbine centrifugal channel. The reducing agent channel system here comprises the reducing agent infeed with a reducing agent annular channel; the reducing agent inlet opening fluidically connected to the reducing agent annular channel in the radial direction on the circumference of the shaft between the compressor and the turbine; the reducing agent channel inside the shaft and fluidically connected to the reducing agent inlet opening; and the reducing agent outlet opening fluidically connected to the reducing agent channel. In a further development, the reducing agent outlet opening is arranged in the radial direction on the circumference of the shaft in the outflow region of the turbine. In an alternative embodiment, the reducing agent channel system comprises the turbine centrifugal channel fluidically connected to the reducing agent outlet opening, wherein the reducing agent outlet opening is arranged in the radial direction on the circumference of the shaft in the region of the turbine. Both a reduction in nitrogen emissions and a cooling of the rotor are achieved by the reducing agent infeed.

For a secondary air infeed, the interior of the compressor housing is fluidically connected to the interior of the turbine housing by means of a secondary air channel system, wherein the secondary air channel system comprises at least the channel as secondary air channel in the interior of the shaft, a secondary air inlet opening, and a secondary air outlet opening in the shaft. Furthermore, in the secondary air channel system, a secondary air valve unit is provided, by means of which the fluidic connection through the secondary air channel system can be opened for a secondary air infeed and can be closed to stop secondary air recirculation. The secondary air valve unit is preferably accommodated in the exhaust-gas turbocharger housing. In an advantageous manner according to the invention, the secondary air channel system is fluidically connected to the interior of the compressor housing in the flow direction of combustion air after the compressor, i.e., downstream of the compressor, and to the interior of the turbine housing in the flow direction after the turbine, i.e., downstream of the turbine, or to the turbine centrifugal channel. The secondary air channel system here comprises a secondary air infeed, fluidically connected upstream to the interior of the turbine housing, with the secondary air valve unit and with a secondary air annular channel; the secondary air inlet opening fluidically connected to the secondary air annular channel in the radial direction on the circumference of the shaft between the compressor and the turbine; the secondary air channel inside the shaft and fluidically connected to the secondary air inlet opening; and the secondary air outlet opening fluidically connected to the secondary air channel. In a further development, the secondary air outlet opening is arranged in the radial direction on the circumference of the shaft in the outflow region of the turbine. In an alternative development, the secondary air channel system comprises the turbine centrifugal channel fluidically connected to the secondary air outlet opening, wherein the secondary air outlet opening is arranged in the radial direction on the circumference of the shaft in the region of the turbine. Both an afterburning and a cooling of the rotor are achieved by means of the secondary air infeed.

Furthermore, an advantageous sealing arrangement according to the invention is provided, by means of which the fluidic connection of the at least one inlet opening and/or the at least one outlet opening and the infeed are sealed with respect to the shaft bearing of the shaft that is rotatably mounted in the bearing housing. Accordingly, at least one shaft seal is located in the bearing housing between the infeed and the shaft bearing.

Figure 1A:
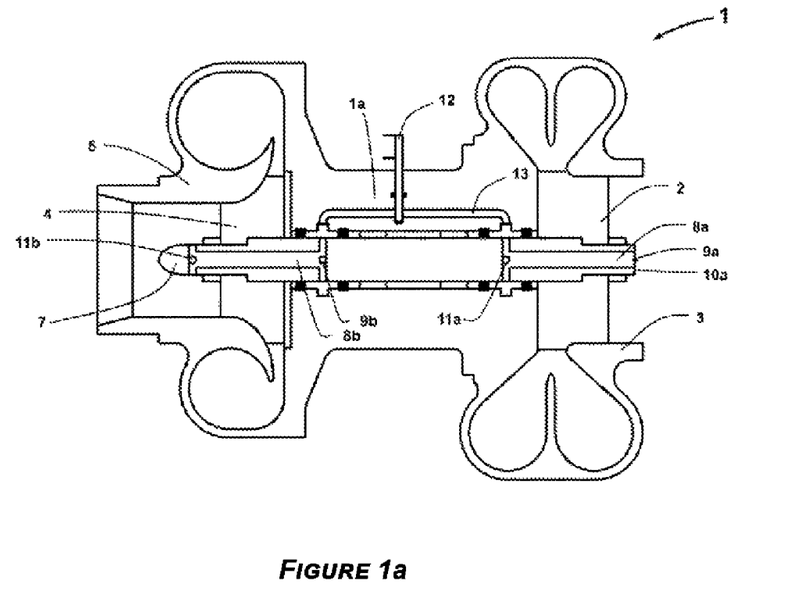
FIG. 1a and FIG. 1b: a schematic sectional view of the exhaust-gas turbocharger 1 in a first embodiment.
Figure 1B:
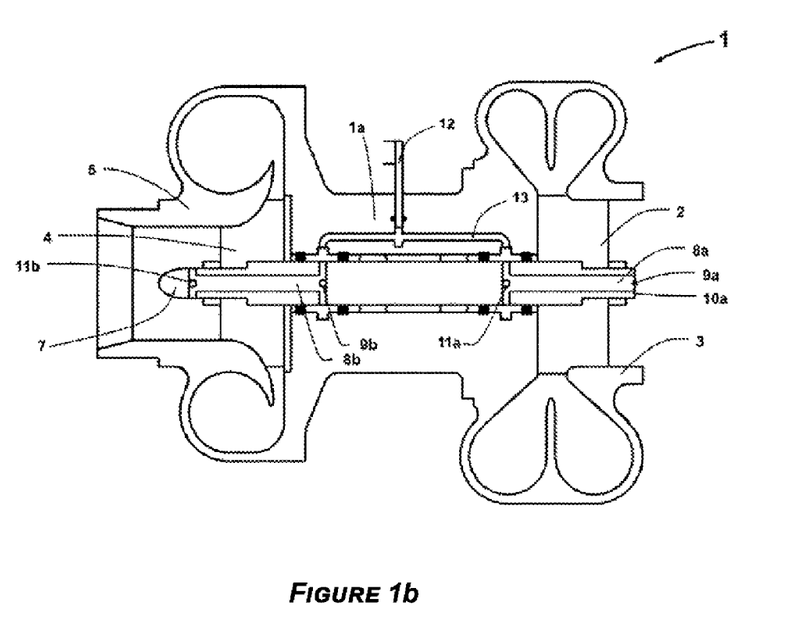

The advantageous exhaust-gas turbocharger 1 according to the invention in a first embodiment, shown in FIG. 1a and FIG. 1b, includes a turbine 2 in a turbine housing 3, a compressor 4 in a compressor housing 5, and a shaft 7, rotatably mounted in a bearing housing 6, by means of which the turbine 2 and the compressor 4 are rigidly connected. The shaft 7 is at least partially designed as a hollow shaft, so that at least a first exhaust-gas channel 8a and a second exhaust-gas channel 8b are formed coaxially inside the shaft 7. The first exhaust-gas channel 8a has a first exhaust-gas inlet opening 9a at a first end face 10a of the shaft 7 and a first exhaust-gas outlet opening 11a in the radial direction on the circumference of the shaft 7 between the turbine 2 and compressor 4. The second exhaust-gas channel 8b has a second exhaust-gas inlet opening 9b in the radial direction on the circumference of the shaft 7 between the turbine 2 and compressor 4 and a second exhaust-gas outlet opening 11b in the radial direction on the circumference of the shaft 7 upstream of the compressor 4. By means of a switchable exhaust-gas valve unit 12 in an exhaust-gas infeed channel 13 in an exhaust-gas turbocharger housing 1a, the first exhaust-gas channel 8a, for no exhaust-gas recirculation, is not fluidically connected, as shown in FIG. 1a, or, for an exhaust-gas recirculation, is fluidically connected, as shown in FIG. 1b, to the second exhaust-gas channel 8b via the first exhaust-gas outlet opening 11a and second exhaust-gas inlet opening 9b.

Figure 2A:
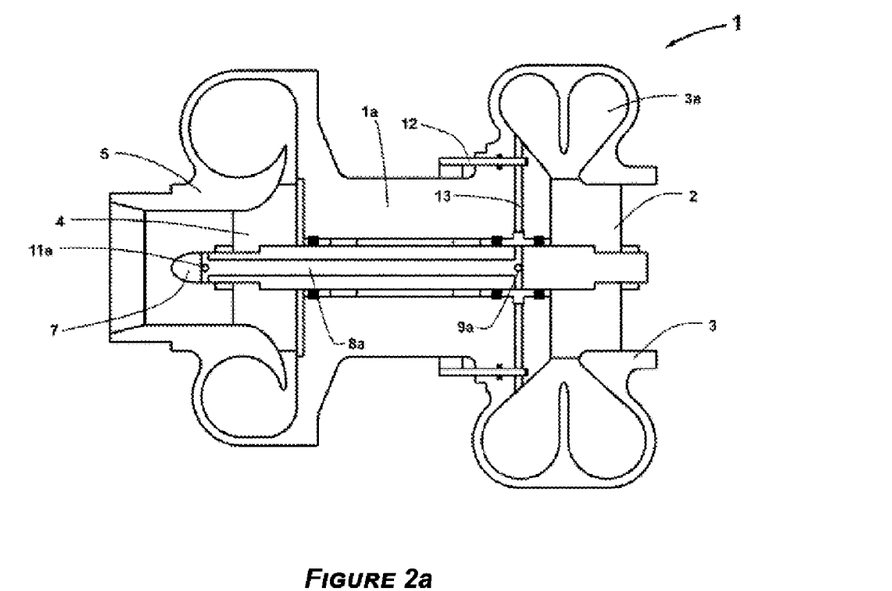
FIG. 2a and FIG. 2b: a schematic sectional view of the exhaust-gas turbocharger 1 in a second embodiment.
Figure 2B:
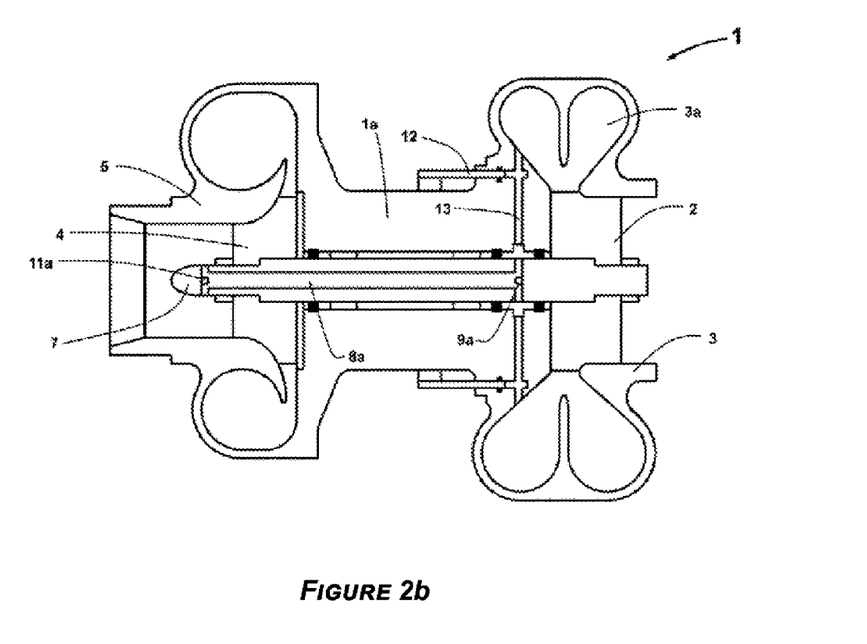

In a second embodiment, shown in FIG. 2a and FIG. 2b, the shaft 7 of the advantageous exhaust-gas turbocharger 1 according to the invention comprises a first exhaust-gas channel 8a arranged coaxially in its interior. The first exhaust-gas channel 8a has a first exhaust-gas inlet opening 9a in the radial direction on the circumference of the shaft 7 between the turbine 2 and compressor 4 and a first exhaust-gas outlet opening 11a in the radial direction on the circumference of the shaft 7 upstream of the compressor 4. The exhaust-gas infeed channel 13 is fluidically connected to the first exhaust-gas inlet opening 9a and to an interior space 3a of the turbine housing 3 upstream of the turbine 2. By means of the switchable exhaust-gas valve unit 12 in the exhaust-gas infeed channel 13, the first exhaust-gas channel 8a, for no exhaust-gas recirculation, is not fluidically connected, as shown in FIG. 2a, or, for an exhaust-gas recirculation, is fluidically connected, as shown in FIG. 2b, to the interior space 3a of the turbine housing 3 via the first exhaust-gas inlet opening 9a.

Figure 2C:
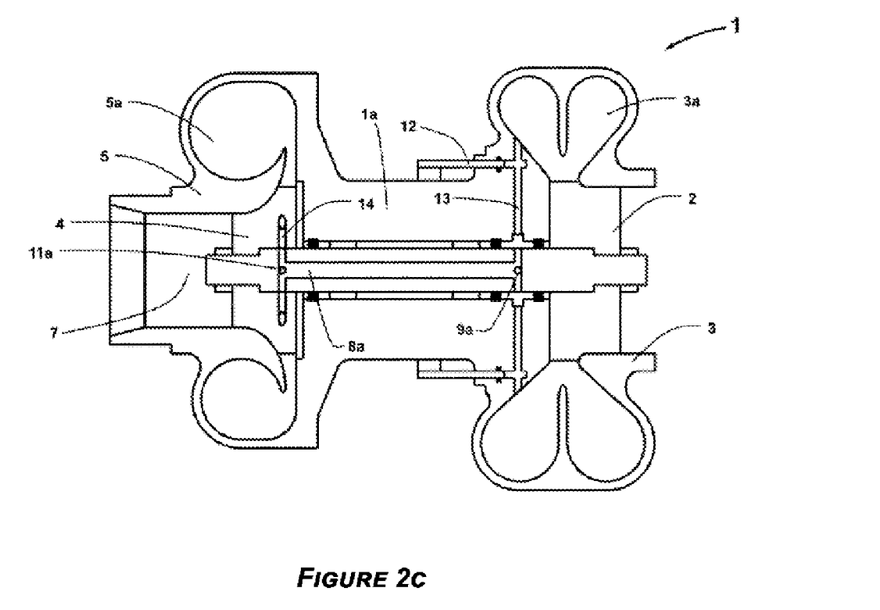
FIG. 2c: a schematic sectional view of the exhaust-gas turbocharger 1 in a third embodiment.

In a third embodiment, shown in FIG. 2c, alternative to the second embodiment, the first exhaust-gas outlet opening 11a is arranged in the radial direction on the circumference of the shaft 7 in the region of the compressor 4 and fluidically connected to an exhaust-gas centrifugal channel 14 in the compressor 4. The exhaust-gas centrifugal channel 14 is in turn fluidically connected to an interior space 5a of the compressor housing 5.

Figure 3A:
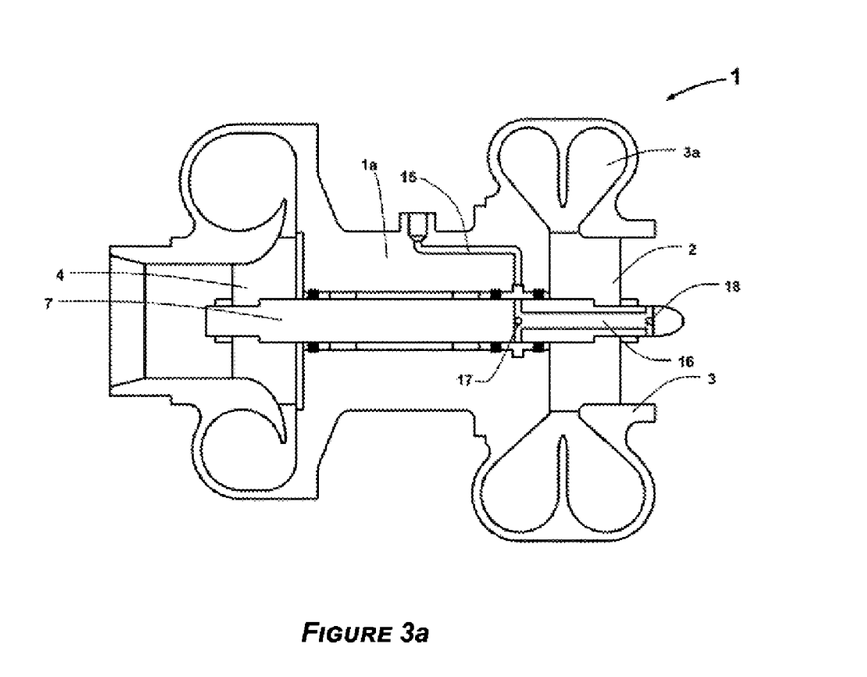
FIG. 3a: a schematic sectional view of the exhaust-gas turbocharger 1 in a fourth embodiment.

The advantageous exhaust-gas turbocharger 1 according to the invention in a fourth embodiment, as shown in FIG. 3a, comprises a reducing agent infeed channel 15 in the exhaust-gas turbocharger housing 1a. At least one reducing agent channel 16 is formed inside the shaft 7. The reducing agent channel 16 has a reducing agent inlet opening 17 in the radial direction on the circumference of the shaft 7 between the turbine 2 and compressor 4 and a reducing agent outlet opening 18 in the radial direction on the circumference of the shaft 7 downstream of the turbine 2. For a reducing agent infeed by means of a reducing agent metering device, the reducing agent infeed channel 15 is fluidically connected to the interior space 3a of the turbine housing 3 via the reducing agent inlet opening 17, the reducing agent channel 16, and the reducing agent outlet opening 18.

Figure 3B:
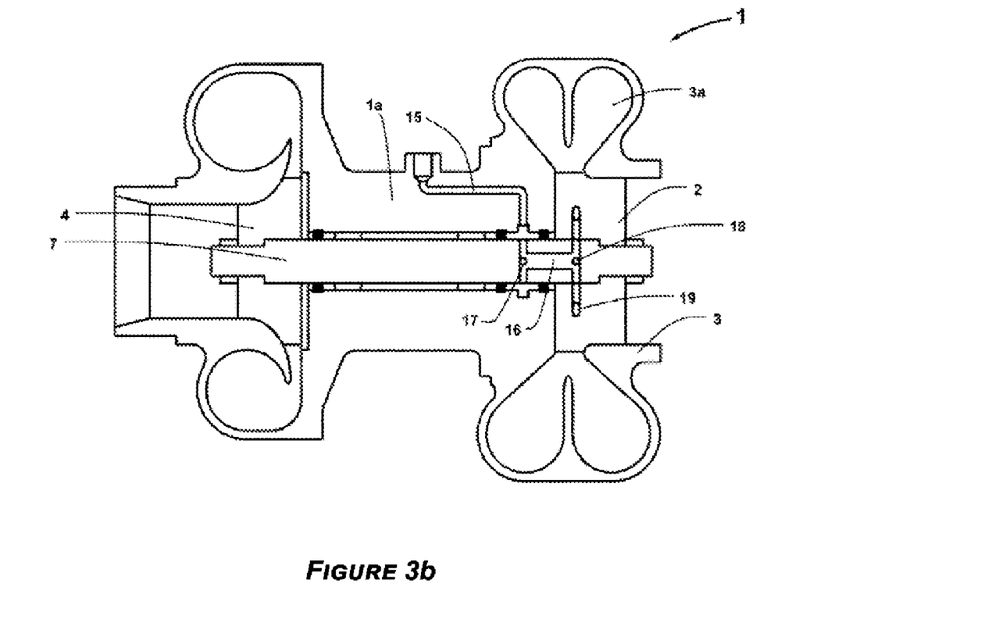
FIG. 3b: a schematic sectional view of the exhaust-gas turbocharger 1 in a fifth embodiment.

In a fifth embodiment, shown in FIG. 3b, alternative to the fourth embodiment, the reducing agent outlet opening 18 is arranged in the radial direction on the circumference of the shaft 7 in the region of the compressor 4 and fluidically connected to a reducing agent centrifugal channel 19 in the turbine 2. The reducing agent centrifugal channel 19 is in turn fluidically connected to the interior space 3a of the turbine housing 3.

Figure 4A:
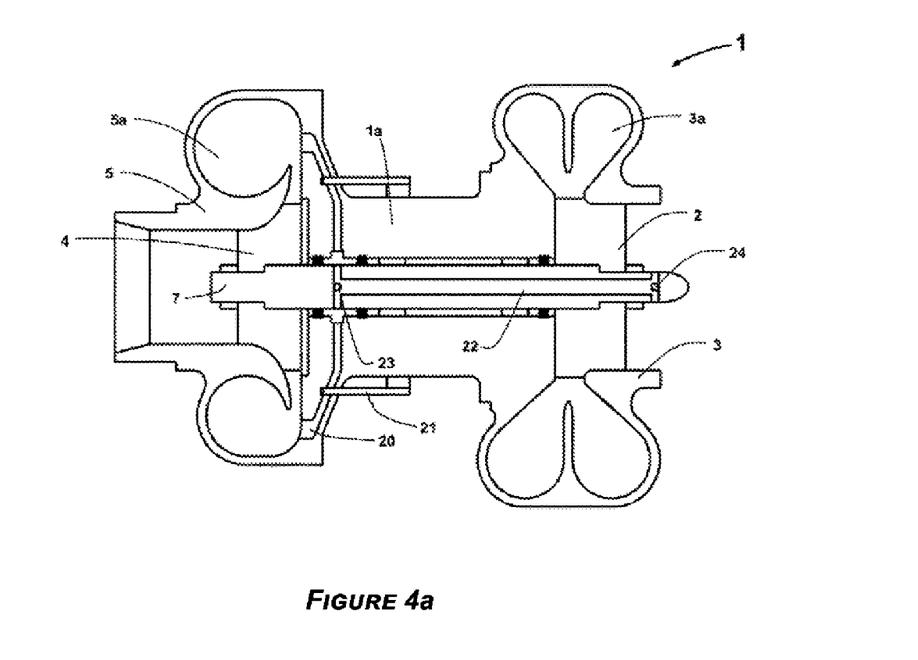
FIG. 4a and FIG. 4b: a schematic sectional view of the exhaust-gas turbocharger 1 in a sixth embodiment.
Figure 4B:
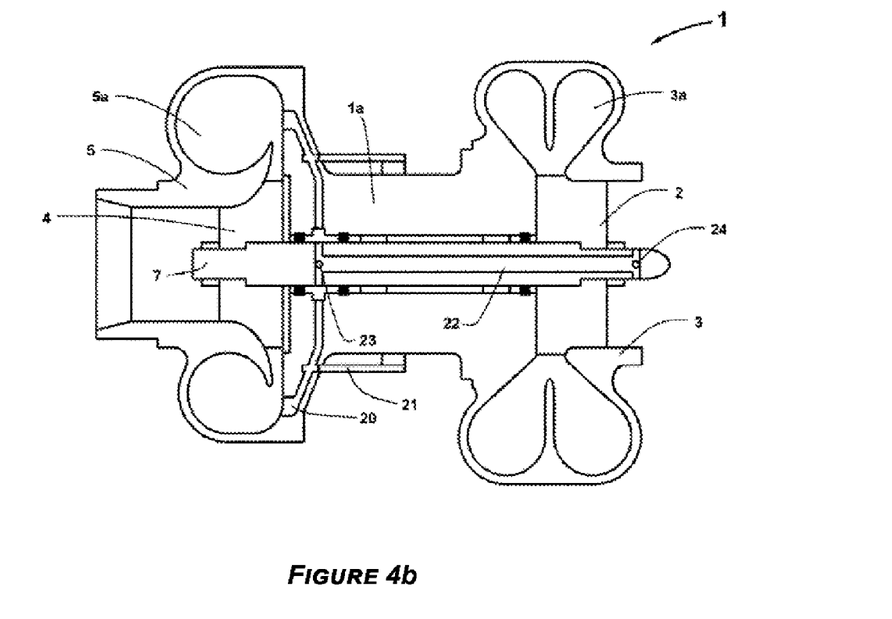
Figure 5:
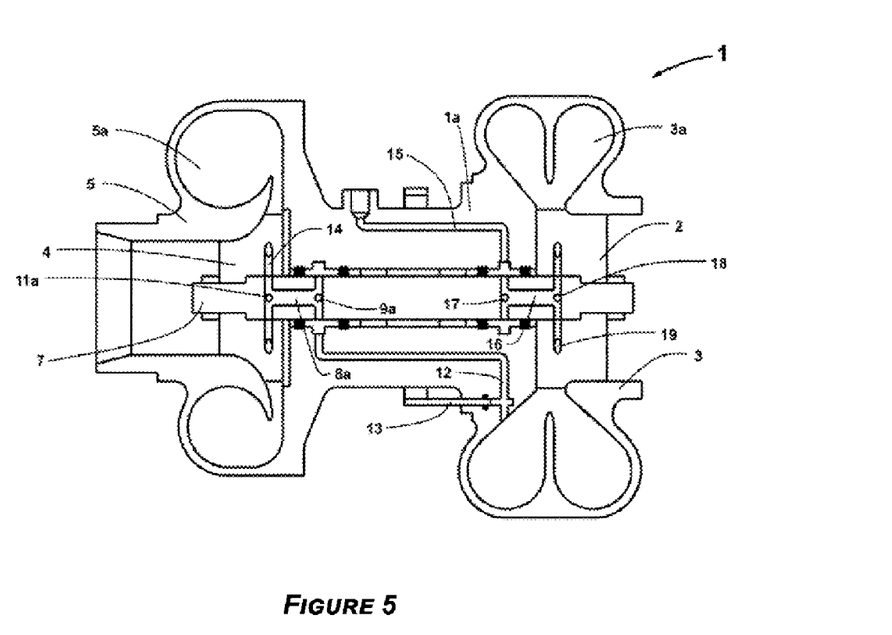
FIG. 5: a schematic sectional view of the exhaust-gas turbocharger 1 in a seventh embodiment.

The advantageous exhaust-gas turbocharger 1 according to the invention in a sixth embodiment, as shown in FIG. 4a and FIG. 4b, comprises a secondary air infeed channel 20 with a secondary air valve unit 21 in the exhaust-gas turbocharger housing 1a. At least one secondary air channel 22 is formed inside the shaft 7. The secondary air channel 22 has a secondary air inlet opening 23 in the radial direction on the circumference of the shaft 7 between the turbine 2 and compressor 4 and a secondary air outlet opening 24 in the radial direction on the circumference of the shaft 7 downstream of the turbine 2. By means of the switchable secondary air valve unit 21 in the secondary air infeed channel 20, the secondary air channel 22, for no secondary air infeed, is not fluidically connected, as shown in FIG. 4a, or, for a secondary air infeed, is fluidically connected, as shown in FIG. 4b, to the interior space 5a of the compressor housing 5 via the secondary air inlet opening 23.

The advantageous exhaust-gas turbocharger 1 according to the invention in a seventh embodiment, shown in FIG. 4a and FIG. 4b, represents a particularly advantageous combination of the third embodiment, shown in FIG. 2c, and of the fifth embodiment, shown in FIG. 3b.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS USED

Exhaust-gas turbocharger
1a Exhaust-gas turbocharger housing
2 Turbine
3 Turbine housing
3a Interior space of the turbine housing 3
4 Compressor
5 Compressor housing
5a Interior space of the compressor housing 5
6 Bearing housing
7 Shaft
8a First exhaust-gas channel
8b Second exhaust-gas channel
9a First exhaust-gas inlet opening
9b Second exhaust-gas inlet opening
10a First end face of the shaft 7
11a First exhaust-gas outlet opening
11b Second exhaust-gas outlet opening
12 Exhaust-gas valve unit
13 Exhaust-gas infeed channel
14 Exhaust-gas centrifugal channel
15 Reducing agent infeed channel 16 Reducing agent channel
17 Reducing agent inlet opening
18 Reducing agent outlet opening
19 Reducing agent centrifugal channel
20 Secondary air infeed channel
21 Secondary air valve unit
22 Secondary air channel
23 Secondary air inlet opening
24 Secondary air outlet opening

The invention claimed is:

1. An exhaust-gas turbocharger, comprising
an exhaust-gas turbocharger housing having a turbine housing, a compressor housing, and a bearing housing;
a turbine in the turbine housing;
a compressor in the compressor housing; and
a shaft rotatably mounted in the bearing housing, by which the turbine and the compressor are rigidly connected, at least one channel having an inlet opening and an outlet opening is formed inside the shaft, the inlet opening and/or the outlet opening being arranged in a radial direction on a circumference of the shaft between the turbine and the compressor,
wherein the at least one channel is part of a channel system of an exhaust-gas recirculation system, a reducing agent infeed, or a secondary air infeed, and
wherein, for the secondary air infeed, an interior space of the compressor housing in a flow direction of combustion air after the compressor is in fluidic connection with an interior space of the turbine housing.

2. The exhaust-gas turbocharger according to claim 1, wherein the inlet opening and/or the outlet opening are fluidically connected to an infeed in the exhaust-gas turbocharger housing.

3. The exhaust-gas turbocharger according to claim 2, wherein the infeed comprises an annular channel around the shaft in a region of the inlet opening or outlet opening in the exhaust-gas turbocharger housing, so that entry of exhaust gas, reducing agent, or secondary air into the at least one channel, or a discharge of exhaust gas, reducing agent, or secondary air from the at least one channel via the annular channel can take place independently of a rotational position of the shaft.

* * * * *